Figure 1:
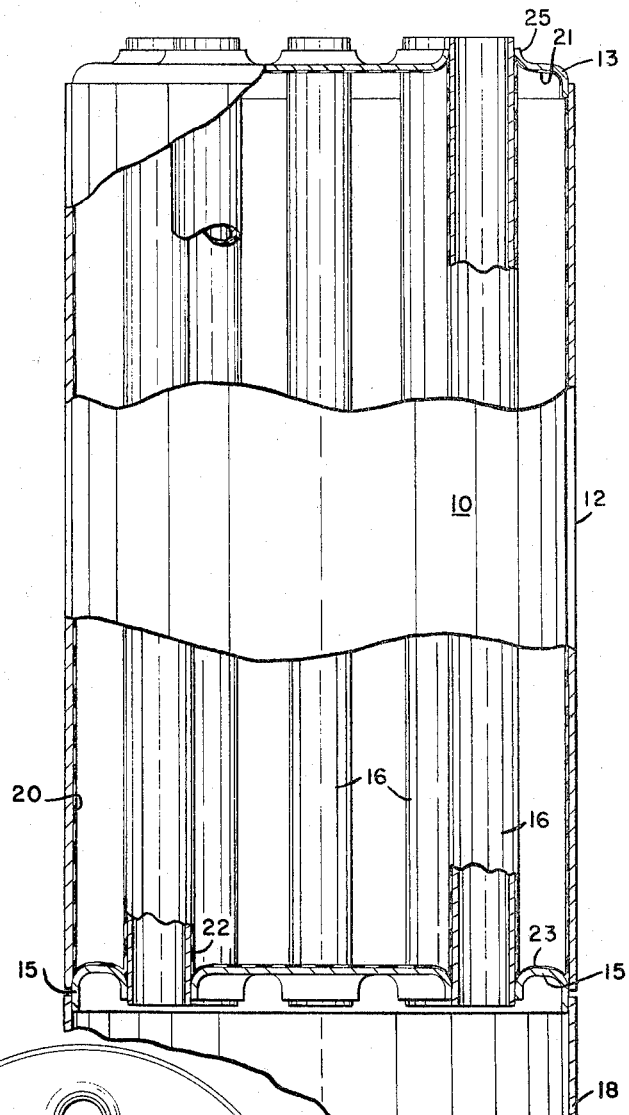

Aug. 30, 1966   L. R. ERWIN ETAL   3,268,989
METHOD OF ASSEMBLING A CERAMIC LINED WATER HEATER
Filed March 26, 1962

INVENTORS.
LEE R. ERWIN.
GORDON E. GUSTAVSON.
DOUGLAS W. MC CALLUM.
BY *Herman Seid*
ATTORNEY.

3,268,989
METHOD OF ASSEMBLING A CERAMIC LINED WATER HEATER
Lee R. Erwin, Duarte, Gordon E. Gustavson, Brea, and Douglas W. McCallum, Norwalk, Calif., assignors to Carrier Corporation, Syracuse, N.Y., a corporation of Delaware
Filed Mar. 26, 1962, Ser. No. 182,537
1 Claim. (Cl. 29—157.3)

This invention relates to techniques for welding coated materials, more particularly to a method of assembly for ceramic lined flue type water heaters.

When two coated metal elements are to be joined by welding, the heat of the welding operation engenders a variety of problems in maintaining the coating intact with respect to the metal surface. This is due to the fact that the temperatures required to effect the welding bond cause expansion of the materials being welded with a resulting crazing, spalling or chipping of the coating. Thus in fabricating glass lined hot water tanks, the coating employed for lining these tanks is often damaged during assembly.

The term "ceramic" will be here employed to denote the class of materials including glass, enamel, porcelain, and the like materials utilized in coating metals to prevent corrosion.

In fabricating flue type water heaters of relatively small capacity, the dimensions of the heater components are such that the stresses set up in welding the components of the heater together generally present no significant production problem. However, contemporary trends have given rise to the need for water heating units having high recovery rates. This necessitates a high heat input, and a relatively large surface area to efficiently accommodate the increased heat input. The larger surface area results in an increase of the size of the heater.

With these larger water heaters, the application of localized heat for welding purposes produces substantial stresses in the heater components since the areas remote from the point of application of welding heat remain relatively cool, and the differing rates of expansion of the cool and hot sections of the heater result in damage to the ceramic coating.

It is with the above problems in mind that the present means have been evolved, means including both method and article permitting the efficient fabrication of a ceramic lined water heater of relatively large dimensions by the utilization of welding techniques without damaging the ceramic lining.

It is accordingly a primary object of this invention to provide an improved technique for joining coated members by welding.

A further object of the invention is to provide means for fabricating articles having coated components without damaging the coating.

It is also an object of this invention to provide an improved ceramic lined water heater.

Another object of the invention is to provide a novel method for assembly of a flue type lined water heater so as to eliminate damage of the ceramic lining during assembly.

These and other objects of the invention which will become hereafter apparent are attained by welding the relatively large components of the water heater before fusing the ceramic lining to the metal. Thus the conventional water heater having a relatively large top head, shell, and bottom head, with relatively small flues (as compared to head and shell dimensions) is fabricated by coating the heads and the shell with the desired ceramic coating slip, and merely drying the slip sufficiently to a point of viscosity such that the coated components may be moved without disturbing the coating. The relatively small flues are sprayed with the desired coating and may be fired to fuse the coating to the flue surface. In assembly, the heads are welded to the shell, and the flues welded in position within the shell through the heads. Thereafter, the assembled heater is fired to fuse the coating on the heads and shell to the metal. Since the coating over the areas subject to maximum stress during welding, namely the relatively large heads and the shell, did not have their coatings fused thereto, no stresses were set up in the coating and damage of the coating does not occur.

An important feature of the invention resides in the elimination of coating damage during assembly of an article including coated metals, by virtue of the formation of a bond between the metal and its coating only after assembly is complete, thereby permitting stressing of the metal without straining the coating.

Figure 2:
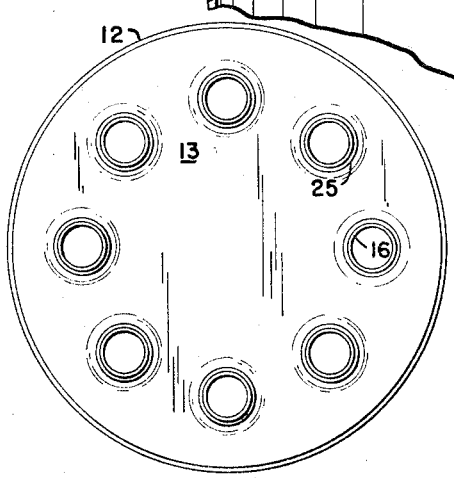

The specific details of a preferred embodiment of the invention and their mode of fabrication will be made most manifest and particularly pointed out in clear, concise and exact terms in conjunction with the accompanying drawings, wherein:

FIGURE 1 is a side view with parts broken away of a tube type water heater fabricated in accordance with the teachings of this invention; and FIGURE 2 is a top plan view of the top head of the water heater of FIGURE 1.

Referring now more particularly to the drawings, like numerals in the various figures will be employed to designate like parts. The novel inventive concept implementing the welding of relatively large coated components, one to the other, is here illustrated as embodied in a water heater.

As best seen in FIGURES 1 and 2, the water heater 10 is ceramic lined and is of the flue type. Water heater 10 is of the vertical tank type, but it will be appreciated by those skilled in the art that the invention may be practiced with tanks of any type.

The heater 10 is formed with a cylindrical shell 12, a top head 13, and a bottom head 15. Extending through shell 12, and bottom head 15, and top head 13 are flues 16, one of which is shown in FIGURE 1. A skirt 18 is arranged beneath the bottom head 15 in conventional fashion.

In order to minimize corrosion, pitting, and the like deleterious effects of water on the metal portions of the heater 10 with which the water is normally in contact, these surfaces are coated with a suitable ceramic lining such as glass, enamel, porcelain, or the like materials. Thus, as seen in the drawing, a shell coating 20, a top head coating 21, a flue coating 22 and a bottom head coating 23 are provided on the interior of the tank of heater 10. It is essential that the coating on each of the aforementioned components form a substantially continuous surface to prevent contact of the water at any joints.

In assembling the above described water heater structure, the desired flue coating 22 is applied to the flues 16 preferably by spraying. The coating is then dried, and fired to fuse the coating 22 to the flue 16.

The top head 13 is press fitted in position with respect to shell 12, and the desired coating is applied to the interior of the top head 13 and shell 12. Shell coating 20 and top head coating 21 are preferably applied by spraying, after which shell coating 20 and top head coating 21 are dried to drive off sufficient moisture so that these coatings have a viscosity permitting handling of the top head and shell assembly. The viscosity of the dried bisque coating is such as to prevent damage of the coating when stresses are set up in the head and shell to which the coating is applied.

The bottom head 15, like the aforedescribed head 13 and shell 12 has bottom head coating 23 applied thereto by spraying or flow coating and this bottom head coating 23 is also only dried to a point of viscosity permitting accommodation of any distortions of bottom head 15.

The top head 13 and shell 12 assembly is set in a vertical position with the top head 13 facing downwardly.

The flues 16 which have had coating 22 fused thereto are placed in position in the draw necks 25 of the top head 13.

Thereafter the bottom head 15 is lowered over flues 16 into position with respect to shell 12. The flues 16 are then welded at both ends to heads 13 and 15.

After this, the heads 13 and 15 are welded to shell 12, and the complete unit is placed in the firing furnace where the ceramic coating on the heads and shell are fused to the surface of the heads and shell.

The novel water heater 10, and method for forming same permit the fabrication of the relatively large size water heaters now found desirable. By utilizing the instant assembly technique to form the novel heater structure, the damaging stresses in the coating normally set up by the application of localized welding heat to the relatively large surface areas of the heads and shell are eliminated.

This desired result is obtained by virtue of the fact that the ceramic coating on those areas of the heater which are subject to distortion due to localized expansion produced by the localized application of welding heat do not have the coating fused thereto so that the coating is not distorted and as a result is not damaged.

In the illustrated and described embodiment of the invention, the flues 16 have had their coating 22 fused to the flue surface, since it is found that with the relatively small flue surface areas the welding heat is not localized in nature, but is applied substantially uniformly. Where there is a substantial uniformity of heat application, the expansion of the coated surface is substantially uniform, and as a result there is no damage to the coating due to the distortion produced by the irregular expansion of a localized surface area such as is encountered in the relatively large head and shell components. Additionally, since the flues are interiorly located in the assembled heater, it is found that the firing operation is made more efficient by fusing the flue coating prior to the final fusing operation. It will, however, be apparent to those skilled in the art that this is not essential, and that the flue coating may be merely dried, as were the head and shell coatings.

It is thus seen that an improved technique has been provided to implement the welding of coated materials so as to prevent damage to the coating by distortions set up by the localized application of welding heat.

While we have described a preferred embodiment of our invention, it will be understood it is not limited thereto, but may be otherwise embodied within the scope of the following claim.

We claim:

A method of assembling a flue type ceramic lined water heater including a top head and shell assembly of relatively large surface area, a bottom head of relatively large surface area, and flues of relatively small surface area as compared to the surface areas of said shell and heads, said method comprising the steps of: spraying the flues with the ceramic coating slip; drying the slip on the flues; firing the coating on the flues to fuse the coating to the surface of the flue; spraying the top head and shell assembly with the ceramic coating slip; drying the coating on the head and shell assembly; spraying the bottom head with the ceramic coating; drying the ceramic coating on the bottom head; positioning the top head and shell assembly with the top head down; positioning the flues in position with respect to the top head; lowering the bottom head over the flues into position with respect thereto and the shell; welding the flues to the bottom head and top head; welding the top and bottom heads to the shell; and firing the welded heads, shell and flues to fuse the ceramic lining to the surfaces to which the lining is applied.

References Cited by the Examiner

UNITED STATES PATENTS

| | | | |
|---|---|---|---|
| 2,229,526 | 1/1941 | Schabacker | 29—458 |
| 2,322,488 | 6/1943 | Uecker | 29—157.4 X |
| 2,348,696 | 5/1944 | Schabacker | 29—157.4 X |
| 2,372,946 | 4/1945 | Foster et al. | 29—157.4 |
| 2,618,846 | 11/1952 | Morris et al. | 29—157.4 |
| 2,777,194 | 1/1957 | Ashley | 29—458 |
| 2,842,840 | 7/1958 | Ploetz | 29—458 |
| 2,992,545 | 7/1961 | Walker | 165—133 |
| 3,053,511 | 9/1962 | Godfrey | 165—133 |

JOHN F. CAMPBELL, *Primary Examiner.*

WHITMORE A. WILTZ, ROBERT A. O'LEORY, T. W. STREULE, J. D. HOBART, *Assistant Examiners.*